United States Patent
Kamiguchi et al.

(10) Patent No.: US 7,344,664 B2
(45) Date of Patent: Mar. 18, 2008

(54) PRESSURE WAVEFORM SETTING METHOD FOR INJECTION PRESSURE CONTROL AND AN INJECTION MOLDING MACHINE

(75) Inventors: Masao Kamiguchi, Oshino-mura (JP); Noriaki Neko, Oshino-mura (JP)

(73) Assignee: Fanuc Ltd, Yamanashi (JP)

( * ) Notice: Subject to any disclaimer, the term of this patent is extended or adjusted under 35 U.S.C. 154(b) by 118 days.

(21) Appl. No.: 11/126,141

(22) Filed: May 11, 2005

(65) Prior Publication Data
US 2005/0206025 A1 Sep. 22, 2005

Related U.S. Application Data

(63) Continuation of application No. 08/154,126, filed on Nov. 18, 1993, now abandoned, which is a continuation of application No. 07/930,404, filed on Sep. 14, 1992, now abandoned.

(30) Foreign Application Priority Data

Jan. 14, 1991 (JP) .............................. 1991-15959
Jan. 14, 1992 (WO) ....................... PCT/JP92/00022

(51) Int. Cl.
 *B29C 45/77* (2006.01)
(52) U.S. Cl. .................... 264/40.5; 264/328.1; 425/145
(58) Field of Classification Search ............... 264/40.1, 264/40.5, 328.1; 425/135, 145, 149, 155, 425/159, 162, 170, 542
See application file for complete search history.

(56) References Cited

U.S. PATENT DOCUMENTS 4,889,667 A 12/1989 Kojima (Continued)

FOREIGN PATENT DOCUMENTS

DE 2916782 11/1980

(Continued)

OTHER PUBLICATIONS

Japanese Office action related to corresponding Japanese Application No. 4-502791 mailed Oct. 15, 1996 (Reference BG was cited as a main reference, while reference BI was cited as an example representing the state of the art.).

(Continued)

*Primary Examiner*—Jill L. Heitbrink
(74) *Attorney, Agent, or Firm*—Staas & Halsey LLP (57) ABSTRACT

An injection pressure waveform for use as a target value for injection pressure feedback control is set based on the actual injection pressure waveform detected when a conforming molded article is obtained. Alternatively, the target injection pressure waveform may be set by modifying a previously retained injection pressure waveform or an actual injection pressure waveform. The previously retained injection pressure waveform or actual injection pressure waveform is displayed on a screen of a display device (T1). Two points on the displayed injection pressure waveform are assigned, and the pressure waveform is modified into a line connecting these two points (T3, T6, T8). Further, two points on the injection pressure waveform and one point between these two points are assigned, and the pressure waveform is modified into a circular arc connecting these three points (T4, T7, T8). The injection pressure waveform modified in this manner is set as the target value for the injection pressure feedback control (T8, T9).

8 Claims, 4 Drawing Sheets

U.S. PATENT DOCUMENTS

| | | | |
|---|---|---|---|
| 4,911,629 A | 3/1990 | Fujita | |
| 4,968,462 A | 11/1990 | Hara | |
| 5,005,116 A | 4/1991 | Fujita et al. | |

FOREIGN PATENT DOCUMENTS

| | | | |
|---|---|---|---|
| EP | A-0128722 | | 12/1984 |
| EP | 60-108155 | | 6/1985 |
| EP | A-0299085 | | 1/1989 |
| EP | A-0436732 | | 7/1991 |
| JP | 52-14658 | * | 2/1977 |
| JP | 58-52486 B2 | | 11/1983 |
| JP | 60-104306 | | 6/1985 |
| JP | 61-48003 | | 3/1986 |
| JP | 61-197218 | | 9/1986 |
| JP | 61-201304 | | 9/1986 |
| JP | 62-23722 | | 1/1987 |
| JP | 62-31406 | | 2/1987 |
| JP | 62-104727 | * | 5/1987 |
| JP | 62-157790 | | 7/1987 |
| JP | 62-218118 | | 9/1987 |
| JP | 63-130326 | | 6/1988 |
| JP | A-63130326 | | 6/1988 |
| JP | 1-267017 | | 10/1989 |
| JP | 2-60726 | * | 3/1990 |
| JP | 2-128821 | * | 5/1990 |
| JP | 03-058821 | | 3/1991 |
| JP | 61-154820 | | 7/1996 |

OTHER PUBLICATIONS

Notice of Reasons for Rejection for corresponding Japanese Application No. 4-502791 dated Oct. 15, 1996 (formerly application No. 3-15959).

* cited by examiner

INJECTION PRESSURE STORAGE TABLE

| ADDRESS | INJECTION PRESSURE | (TIME) |
|---|---|---|
| 0 | p0 | 0 |
| 1 | p1 | τ |
| 2 | p2 | 2·τ |
| ⋮ | ⋮ | ⋮ |
| i | pi | i·τ |
| ⋮ | ⋮ | ⋮ |
| n | pn | n·τ |
| n+1 | — | (n+1)·τ |
| ⋮ | ⋮ | ⋮ |
| N | — | Tmax. |

PRESSURE WAVEFORM SETTING METHOD FOR INJECTION PRESSURE CONTROL AND AN INJECTION MOLDING MACHINE

CROSS REFERENCE TO RELATED APPLICATIONS

This application is a continuation of U.S. application Ser. No. 08/154,126 filed Nov. 18, 1993 which is abandoned and which is a continuation of U.S. application Ser. No. 07/930,404 filed Sep. 14, 1992 which is abandoned.

BACKGROUND OF THE INVENTION

1. Field of the Invention

The present invention relates to an injection molding machine capable of providing feedback control of an injection pressure for making it equal to a target injection pressure in the injection and dwell stages, more particularly, to a method for setting waveform of an injection pressure to be used in setting a target value and an injection molding machine for carrying out this method.

2. Description of the Related Art

Generally, according to a conventional injection molding machine, the injection speed is set in accordance with the advanced position of a screw, and the advancing speed of the screw is controlled to be made equal to the set injection speed, in an injection stage. In a dwell stage, the machine is controlled so that a set dwell pressure is applied to a resin.

In an actual molding operation, however, the propriety of the injection pressure influences the conformity of molded articles much more greatly than that of the injection speed. It is desirable, therefore, that the injection pressure should be feedback-controlled during the injection and dwell stages. The inventor hereof proposed a control system in which a pressure sensor is mounted on a screw shaft, and the dwell pressure is feedback-controlled by detecting a pressure of the resin acting on the screw shaft. This is disclosed in Published Unexamined Japanese Patent Application No. 62-218118. However, the system disclosed in this published application is associated with pressure control for the dwell stage only.

Disclosed in Published Examined Japanese Patent Application No. 58-52486, is a hydraulically-operated injection molding machine in which the in-mold pressure is detected by means of a pressure sensor provided in a resin passage of a mold, and is feedback-controlled to be made equal to a set pressure. In this case, the in-mold pressure is detected, so that the pressure of the resin during injection cannot be detected. Thus, the pressure acting on the resin cannot be accurately detected.

Thus, the inventor developed an injection molding machine in which a pressure sensor is mounted on a screw shaft so that not only the pressure applied to a resin during an injection/dwell stage can be detected but also the change of the pressure acting on the resin during the injection/dwell stage is optionally set as an injection pressure waveform based on a function of time, and the injection pressure is feedback-controlled so that an actual injection pressure waveform detected by means of the pressure sensor coincides with the set injection pressure waveform, and the inventor has filed an application for a patent in Japan. This application is published as Published Unexamined Japanese Patent Application No. 3-58821.

In this injection molding machine for feedback-controlling injection/dwell pressure, described in Published Unexamined Japanese Patent Application No. 3-58821, the injection pressure waveform as a target value can be set optionally. It is impossible, however, to set an existing injection pressure waveform or a modified injection pressure waveform obtained by modifying the existing injection pressure waveform as a base. Thus, the injection pressure waveform must always be set from the beginning.

Some of similar molds are designed so that an injection pressure waveform suited for one mold can be obtained by partially modifying an injection pressure waveform set for another. The injection pressure waveform can be set very easily if the injection pressure waveform of the one mold can be set by referring to and partially modifying the injection pressure waveform set for the other mold. If no conforming molded article can be obtained by trial injection executed after the feedback control of the injection/dwell pressure based on the once set injection pressure waveform, the injection pressure waveform should be set again. Setting the injection pressure waveform again from the beginning in such a case, is a waste of time and labor, and so it is desirable to modify the previously set injection pressure waveform so that the modified injection pressure waveform can be set.

Further, when the trial injection is executed after the injection pressure waveform is set, the set injection pressure waveform may undergo a sudden change such that the injection molding machine cannot follow the change, thus entailing a substantial difference between the actual injection pressure waveform and the set injection pressure waveform, or a conforming molded article may not be able to be obtained. In such a case, setting of the injection pressure waveform can be facilitated by modifying part of the actual injection pressure waveform with reference to this actual injection pressure waveform so that the modified version can be set as the injection pressure waveform. Also, it is desirable that the actual injection pressure waveform observed when the conforming molded article is obtained should be able to be set directly as the set injection pressure waveform.

SUMMARY OF THE INVENTION

An object of the present invention is to provide a method and an injection molding machine for setting, directly or in a modified form, an actual injection pressure waveform, obtained in the process of adjusting molding conditions, as a target injection pressure waveform for injection pressure feedback control.

Another object of the present invention is to provide a setting method and an injection molding machine for partially modifying an injection pressure waveform as a base and setting this modified injection pressure waveform as an injection pressure waveform for use as a target value for feedback control.

In order to achieve the first object described above, according to the present invention, molding conditions are adjusted; a pressure acting on a resin during an injection/dwell stage when a conforming molded article is obtained is detected as an injection pressure waveform based on a function of time; and the detected injection pressure waveform is set as a target injection pressure waveform for pressure feedback control in the injection/dwell stage. Preferably, trial injection is executed with an injection pressure switching screw position and an injection speed set as molding conditions for the injection/dwell stage in an injection speed control section, and with a dwell pressure and a dwell time, along with other molding conditions, set in a dwell section; the trial injection is executed modifying the molding conditions until the conforming molded article can be obtained, or, in the middle of this operation, an actual injection pressure waveform detected based on the pressure acting on the resin during the injection/dwell stage as the function of time is set as the target injection pressure waveform for pressure feedback control in the injection/dwell stage; the set injection pressure waveform is modified; trial injection is executed through pressure feedback control of the injection/dwell stage; and the molding conditions and the target injection pressure waveform are modified until the conforming molded article can be obtained.

Further, in order to achieve the above method, an injection molding machine according to the present invention comprises a storage means for storing a pressure on a resin detected for each predetermined time interval during an injection/dwell stage, a display control means for causing an actual injection pressure waveform stored in the storage means to be displayed on a screen of a display device in response to an injection pressure waveform modification command, an injection pressure waveform changing means for assigning two points in the injection pressure waveform displayed on the display means, changing the injection pressure waveform between the two points into a straight line connecting the two points to draw a straight line, assigning two points in the injection pressure waveform as a starting point and an end point individually, assigning one point between the two point, changing the injection pressure waveform between the starting and end points into a curve connecting the three points in a circular arc to draw a curve, and an injection pressure waveform setting means for reading an injection pressure for each predetermined time interval from the injection pressure waveform drawn on the screen of the display device and storing the set injection pressure waveform storage means with the read injection pressure as set injection pressure waveform data.

In order to achieve the second object described above, according to the present invention, a set injection pressure waveform observed when a conforming molded article is obtained, or an injection pressure waveform obtained by detecting a pressure acting on a resin during an injection/dwell stage as a function of time is previously stored for each mold; the injection pressure waveform of a new mold similar to the mold, whose injection pressure waveform has been stored, is invoked and displayed on a display device when the similar mold is used for molding; two points in the displayed injection pressure waveform is assigned; the injection pressure waveform between the two points is changed into a straight line by connecting the two points to draw the straight line; two points in the injection pressure waveform are assigned as a starting point and an end point individually; one point between the two point is assigned; the injection pressure waveform between the starting and end points is changed into a curve by connecting the three points in a circular arc to draw the curve; and an injection pressure for each predetermined time interval is read from the modified injection pressure waveform and set as the set injection pressure waveform. Further, in order to achieve this method, an injection molding machine according to the present invention comprises a storage means for storing and retaining the injection pressure waveforms, a display control means for causing an injection pressure waveform selected among the injection pressure waveforms stored in the storage means to be displayed on a screen of a display device, an injection pressure waveform changing means for assigning two points in the injection pressure waveform displayed on the display means, changing the injection pressure waveform between the two points into a straight line connecting the two points to draw the straight line, assigning two points in the injection pressure waveform as a starting point and an end point individually, assigning one point between the two point, changing the injection pressure waveform between the starting and end points into a curve by connecting the three points in a circular arc to draw the curve, and injection pressure waveform setting means for reading an injection pressure for each predetermined time interval from the injection pressure waveform drawn on the screen of the display device and storing the set injection pressure waveform storage means with the read injection pressure as set injection pressure waveform data.

According to the present invention, as described above, the injection pressure waveform observed when the conforming molded article is obtained can be set as the final target injection pressure waveform, since the present invention enables the actual injection pressure waveform detected when the conforming molded article is obtained or the actual injection pressure waveform obtained by the trial injection to be set as the target injection pressure waveform for the injection pressure feedback control. Further, it is possible to set the injection pressure waveform by modifying the previously retained injection pressure waveform or the actual injection pressure waveform for the feedback control of the injection pressure by adjusting the pressure waveform to a target value, so that the injection pressure waveform can be set easily. In the case of a mold whose shape of cavity is similar to that of other mold, in particular, the injection pressure waveform can easily be set by using the previously set injection pressure waveform of the similar mold as a base and modifying the same. If no conforming molded article can be obtained by the set injection pressure waveform, the injection pressure waveform can easily be modified based on the injection pressure waveform set at the time of that injection or the injection pressure waveform actually observed at the time of the injection, so that conditioning of operation can be made easily.

DESCRIPTION OF THE PREFERRED EMBODIMENTS

Figure 1:
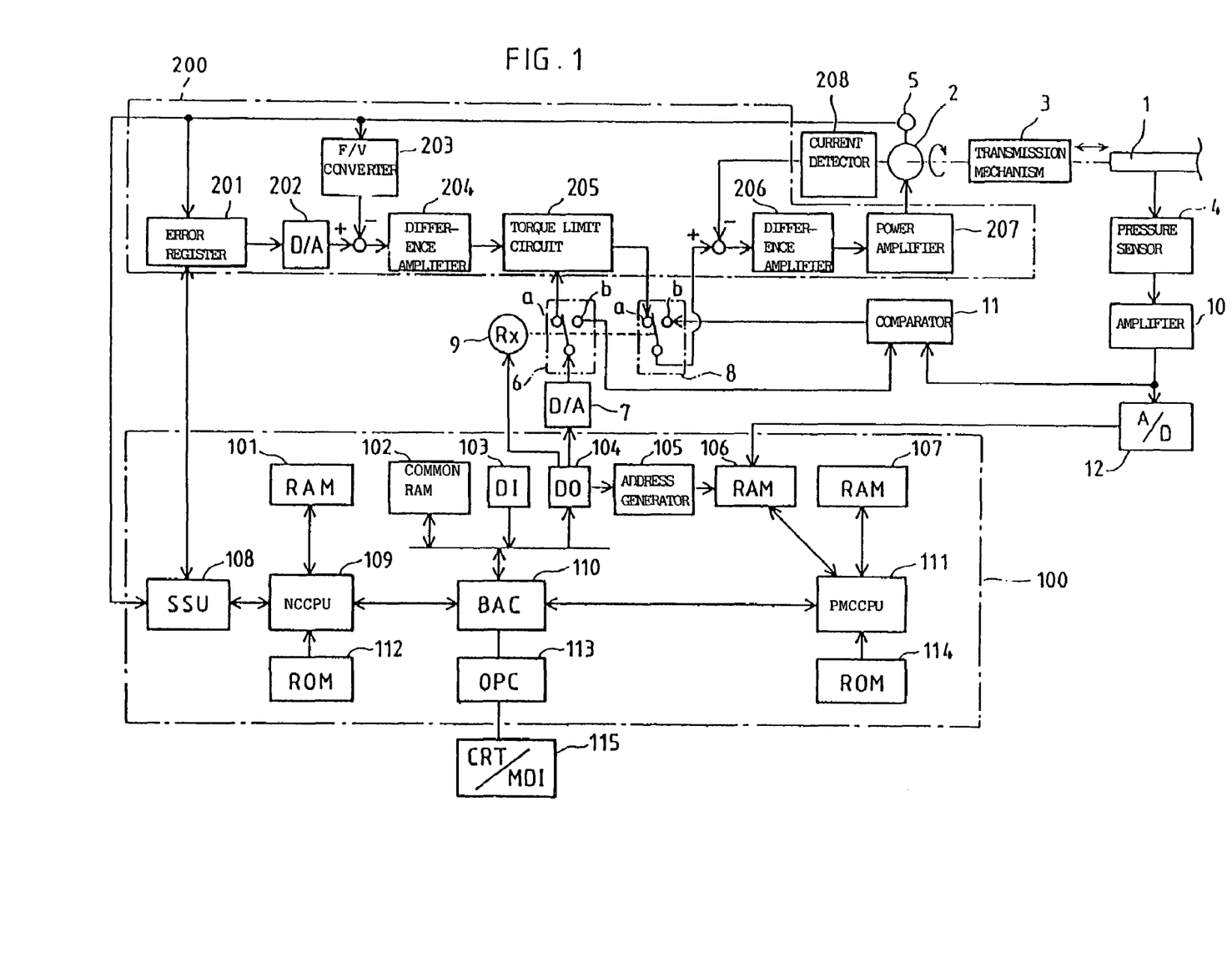
FIG. 1 is a block diagram showing the principal part of a motor-operated injection molding machine according to one embodiment of the present invention.

Referring to FIG. 1, an injection molding machine according to one embodiment of the present invention is a motor-operated injection molding machine which executes operations for various stages, including metering, mold clamping, injection, etc., by using an electric motor. A screw 1 is driven by means of an injection servomotor 2 with the aid of a transmission mechanism 3, and moves in the axial direction of the screw. A pressure sensor 4, which is formed of a wire resistance strain gauge or the like, is mounted on the shaft of the screw 1. The pressure sensor 4 detects resin pressure by detecting an axial pressure from resin acting on the screw 1. Further, the servomotor 2 is fitted with a pulse coder 5 which outputs a predetermined number of detection pulses in accordance with a rotational angle.

A numerical control device (hereinafter referred to as NC device) 100 for controlling the injection molding machine comprises a microprocessor (hereinafter referred to as CPU) 109 for NC and a CPU 111 for a programmable machine controller (hereinafter referred to as PMC). The PMCCPU 111 is connected by a bus to a ROM 114, which, for example, is stored with sequence programs for controlling the sequence operation of the injection molding machine, a RAM 106 for storing a detected injection pressure during an injection/dwell stage, and a RAM 107 for temporary storage of data. The NCCPU 109 is connected to a ROM 112, which is stored with management programs for generally controlling the injection molding machine, and is also connected, through a servo interface 108, to a servo circuit for operatively controlling servomotors for various axes such as those for injection, clamping, screw rotation, ejector operation, etc.

FIG. 1 shows only the injection servomotor 2 and a servo circuit 200 of the servomotor 2.

A nonvolatile common RAM 102, which is composed of a bubble memory or CMOS memory, includes a memory section for storing NC programs and the like for controlling various operations of the injection molding machine, and a set memory section for storing various set values, parameters, macro variables, etc. The set memory section is provided with an injection pressure storage table (see FIG. 5) as a set injection pressure storage means for storing an injection pressure set on the basis of a function of the time elapsed after the start of injection. Further, the common RAM 102 includes a memory section or mold file for storing and retaining, for each mold, various molding conditions set in the set memory section and the injection pressure stored in the injection pressure storage table.

A bus arbiter controller 110 (hereinafter referred to as BAC) is connected with the respective buses of the NCCPU 109, the PMCCPU 111, the common RAM 102, an input circuit 103, and an output circuit 104, and the buses used are controlled by means of the BAC 110. Further, a manual data input device with ORT display unit 115 (hereinafter referred to as CRT/MDI) is connected to the BAC 110 through an operator panel controller 113 (hereinafter referred to as OPC). A keyboard section of the CRT/MDI 115 is provided with ten-keys, cursor shift keys, input command keys, etc. (not shown), and a plurality of soft keys 116a to 116e (see FIG. 4) are arranged at the tower portion of a screen of a CRT display section 115a which constitutes part of the CRT/MDI 115. Various commands and set data can be inputted by operating these keys. The NCCPU 109 is connected by a bus to a RAM 101 used for temporary storage of data and the like.

FIG. 1 shows those elements which are associated with the injection axis of the injection molding machine, that is, the injection servomotor 2 for driving the screw 1 for injection and the pulse coder 5 for detecting the screw position and speed as the servomotor 2 rotates. The other axes such as the clamping axis, screw rotation axis, ejector axis, etc. are omitted in FIG. 1. Thus, only the servo circuit 200 for the injection servomotor is illustrated, and the servo circuits for the other axes are omitted.

The servo circuit 200 comprises an error register 201, D/A converter 202, F/V converter 203, difference amplifiers 204 and 206, torque limit circuit 205, and power amplifier 207. The error register 201 adds a position command, which is the distributed pulses for each predetermined cycle delivered from the NCCPU 109 through the servo interface 108, subtracts pulses, which is delivered from the pulse coder 5 as the injection servomotor 2 rotates, and delivers the present positional deviation corresponding to the command position of the injection servomotor 2. The D/A converter 202 performs D/A conversion of the output of the error register 201, and delivers the converted output as a speed command voltage. The difference amplifier 204 subtracts the output of the pulse coder 5, converted from frequency to voltage by means of the F/V converter 203, from the speed command voltage delivered from the D/A converter 202 to obtain the speed deviation of the injection servomotor 2, and outputs a voltage (hereinafter referred to as torque command voltage) as a torque command. With a normally-closed contact a of a changeover switch 6 closed, the torque limit circuit 205 restricts the torque command voltage from the difference amplifier 204 to a torque limit value delivered from the PMCCPU 111 of the NC device 100 through the output circuit 104 and a D/A converter 7. With a normally-closed contact a of a changeover switch 8 closed, on the other hand, the difference amplifier 206 subtracts a voltage corresponding to a driving current of the injection servomotor 2, detected by means of a current detector 208, from the torque command voltage adjusted by means of the torque limit circuit 205, and amplifies and delivers the resulting deviation to the power amplifier 207. The power amplifier 207 further amplifies the deviation, and controls the position, speed, and torque of the injection servomotor 2.

The changeover switches 6 and 8 are simultaneously shifted by relay means 9, which is controlled through the output circuit 104 by the PMCCPU 111 of the NC device 100. Normally, the normally-closed contact of each switch is closed. When each of the switches 6 and 8 is shifted to the side of the normally-closed contact a, as mentioned before, the torque limit value is applied to the torque limit circuit 205 through the D/A converter 7 and the contact a of the switch 6, and the output of the torque limit circuit 205 is applied to the difference amplifier 206 through the contact a of the switch 8. When the relay means 9 is activated to shift the switches 6 and 8 to the side of its contact b, a torque command voltage corresponding to a set injection pressure (value stored in the injection pressure storage table), delivered from the output circuit 104 of the NC device 100 through the D/A converter 7, is applied to one terminal of a comparator 11 through the contact b of the switch 6. Further, the output of the comparator 11 is applied to the difference amplifier 206 through the contact b of the switch 8.

The output of the pressure sensor 4 attached to the screw 1 is amplified by means of an amplifier 10 to be matched with a voltage corresponding to the present injection/dwell pressure, and connected to the other input terminal of the comparator 11. As a result, the comparator 11, with the respective contacts b of the switches 6 and 8 closed, obtains the difference between the set injection pressure, inputted through the D/A converter 7, and the present injection pressure, and delivers this difference as the torque command voltage to the difference amplifier 206. Thus, a closed loop of the injection servomotor 2 for the injection pressure is formed. Further, the output of the amplifier 10 is applied to an A/D converter 12, whereas the output of the A/D converter 12 is applied to the RAM 106. After the injection is started through the output circuit 104, detected injection pressures are loaded in succession into addresses of the RAM 106 assigned by means of an address generator 105, which successively assigns the addresses from No. 0 with every predetermined cycle.

The detection pulses delivered from the pulse coder 5 are also applied to the servo interface 108, and the numerical control device 100 detects the absolute position of the screw 1 through the servo interface 108.

In the arrangement described above, the NC device 100 normally controls the injection molding machine in a manner such that the NCCPU 109 distributes pulses to the servo circuits for the individual axes of the injection molding machine through the servo interface 108, while the PMC-CPU 111 performs sequence control operation, in accordance with the NC programs for controlling the various operations of the injection molding machine stored in the common RAM 102, the parameters such as the various molding conditions stored in the set memory section, and the sequence programs stored in the ROM 114.

Thereupon, there will first be described an operation for storing the numerical control device 100 with an injection pressure waveform, as the function of the time elapsed after the start of injection, to be used as a reference injection pressure waveform for pressure feedback control.

There are two methods for setting the injection pressure waveform. According to a first method, the injection pressure waveform as the function of the time elapsed after the start of injection is set and stored in the numerical control device 100. According to a second method, as in the conventional case, the injection speed switching position and injection speed are set in an injection stage, whereas the dwell pressure and dwell time are set in a dwell stage, and the other molding conditions are also set. In this method, the actual injection pressure waveform is set as a set injection pressure waveform so that the set injection pressure waveform and molding conditions can be modified until conforming molded article is obtained by trial injection, or during the process of obtaining conforming molded article, and the actual injection pressure waveform observed when the conforming molded article is obtained is set as the final set injection pressure waveform.

The first embodiment of the method will be described first.

An operator first operates the CRT/MDI 115 to select an injection pressure waveform setting mode, thereby causing an injection pressure setting picture to be displayed. A time base indicative of the time elapsed after the start of injection, a pressure base indicative of the injection pressure, and a guidance for the functions of the soft keys are displayed on the CRT display section 115a (see FIG. 4). In this case, the soft key 116a serves as a straight interpolation command key, whereas the soft keys 116b and 116c as an arcuate interpolation command key and a setting end key respectively.

Figure 4:
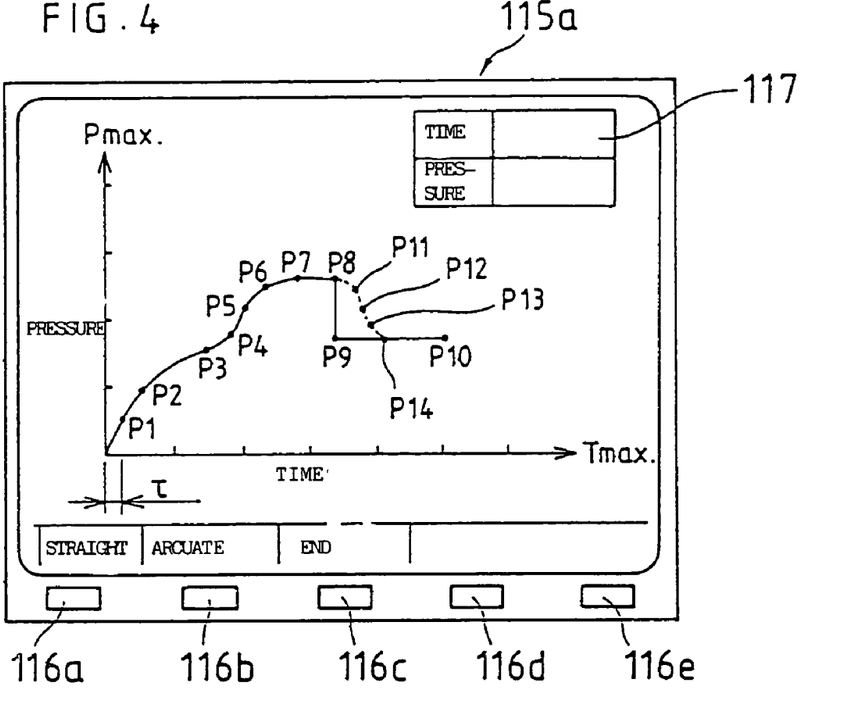
FIG. 4 is a diagram illustrating a display picture of a CRT/MDI used in setting and modifying an injection pressure waveform according to the embodiment.

If the function of the injection pressure to be set is one such as that indicated by solid line in FIG. 4, the operator first operates the soft key 116b to indicate that the functional portion to be set is arcuate, then moves a cursor on the display screen to a point P1 by the cursor shift keys at the keyboard section of the CRT/MDI 115, and operates the input command keys to select the point P1 as a first point for arcuate interpolation. Subsequently, if points P2 and P3 are selected as second and third points respectively for the arcuate interpolation, a circular arc P1P3 connecting these three points is automatically drawn by an arcuate interpolation process. Then, points P3, P4 and P5 are selected to draw a circular arc P3P5, and further points P5, P6 and P7 are selected to draw a circular arc P5P7, in the same manner as that of the aforementioned case. Then, the soft key 116a is operated to indicate that the functional portion to be set is a straight line, then the cursor on the display screen is moved to the point P7, and the input command keys are operated to select the point P7 as a starting point for straight interpolation. Subsequently, if a point P8 is selected as an end point for the straight interpolation, a segment P7P8 connecting the starting point P7 and the end point P8 is automatically drawn. Then, points P8 and P9 are selected to draw a segment P8P9, and points P9 and P10 are selected to draw a segment P9P10, in the same manner as that of the aforementioned case.

According to the present embodiment, numerical data for the time and injection pressure corresponding to the cursor position are displayed on a numerical data display portion 117 of the CRT display section 115a, so that the set injection pressure can be set accurately.

After the set injection pressure is thus graphically set as the function of the time elapsed after the start of injection, the ending end key 116c for setting is operated to store this function in the injection pressure storage table (see FIG. 5) in the common RAM 102.

Figure 5:
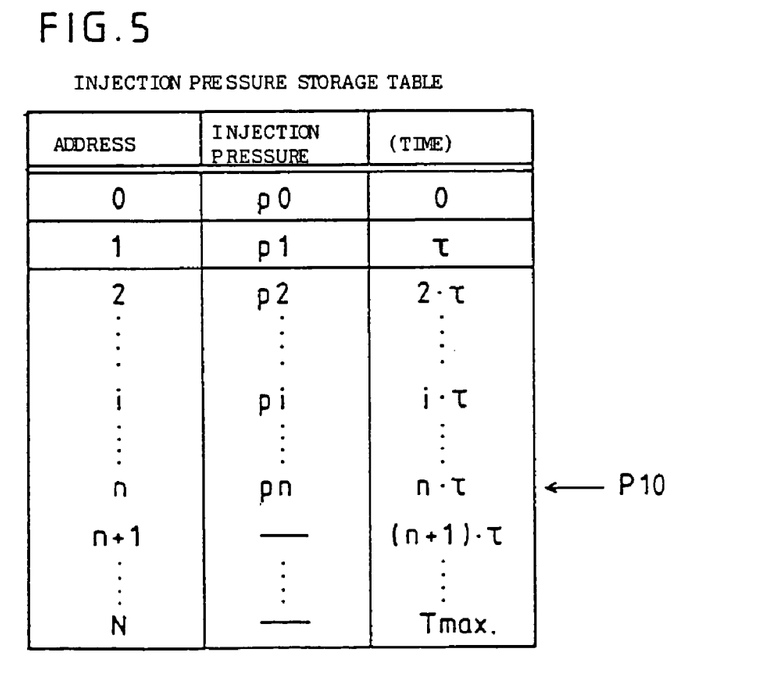
FIG. 5 is a diagram for illustrating an injection pressure storage table according to the embodiment.

The injection pressure storage table is used to store the set injection pressure, given by the graphically set function, correspondingly to the time elapsed after the start of injection. The table contains N number of storage records corresponding to a value obtained by dividing the full scale Tmax. of the time base displayed in the injection pressure setting picture by a unit time $\tau$. Thus, a storage record of the address 0 in the injection pressure storage table is stored with a set injection pressure p0 obtained immediately after the start of injection, that is, after the passage of time 0, in accordance with the function as described above. Thereafter, the storage record of each address i is stored in order with a set injection pressure pi corresponding to the time elapsed after the start of injection at predetermined intervals based on the unit time $\tau$.

The end point of the function defined by the graph of FIG. 4 showing the set injection pressure is the point P10. In the injection pressure storage table, the elapsed time n·$\tau$ corresponding to the time for the point P10, that is, the storage record of an address n, is stored with a set injection pressure pn for the time of completion of dwell, and the set injection pressure is undefined in the address for the point of time (n+1)·$\tau$ after the start of injection and the addresses subsequent thereto. The final address n is stored in a register, and utilized for the process mentioned later.

Figure 2:
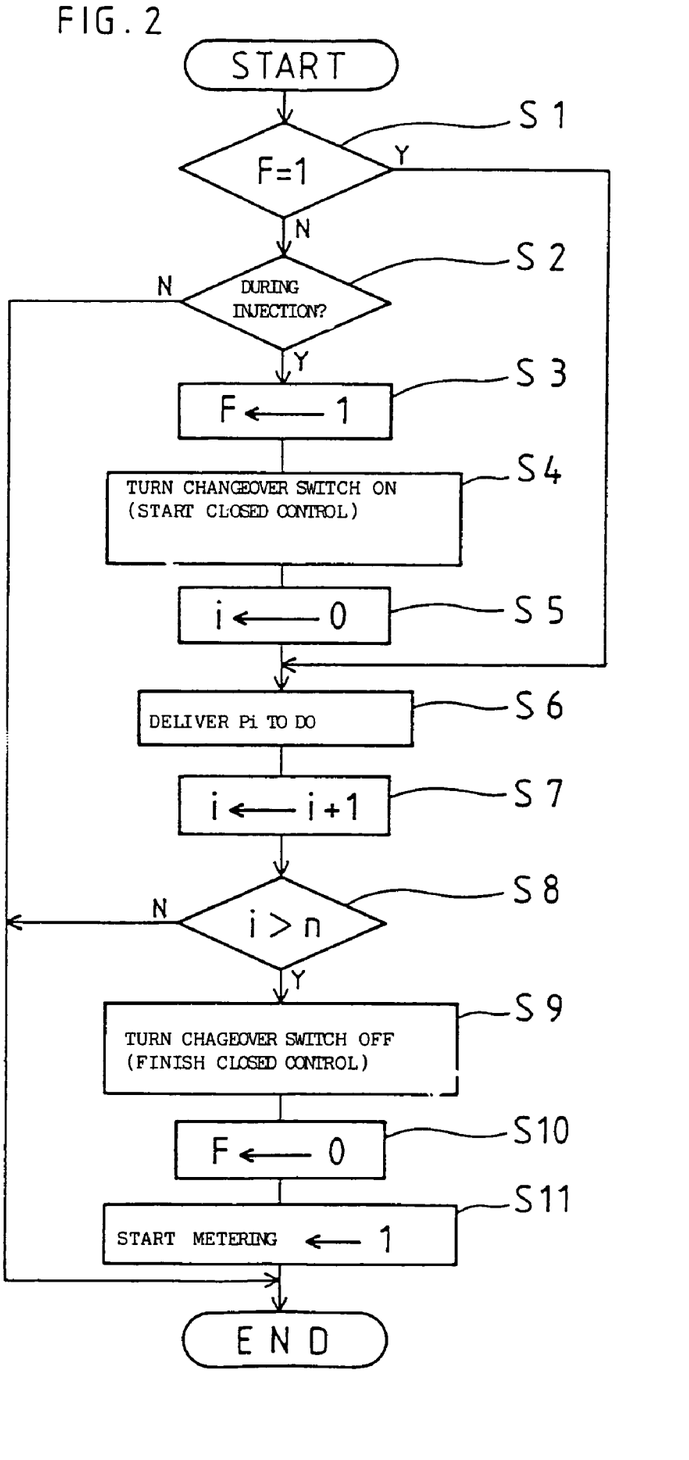
FIG. 2 is a flow chart showing an injection/dwell feedback process according to the embodiment.

After the injection pressure waveform is thus set in the injection pressure storage table, trial injection is executed. The PMCCPU 111 sequentially controls the mold clamping stage, injection/dwell stage, metering stage, cooling stage, and mold opening stage in the same manner as in the conventional case. In performing the trial injection in this injection pressure waveform setting mode, the PMCCPU 109 drives the relay means 9 through the BAC 110 and the output circuit 104 to shift the switches 6 and 8 to the side of the contact b, to start the feedback control of the injection/dwell pressure, when the injection stage is started after the mold clamping stage is finished. Referring to FIG. 2, a process for this feedback control of the injection/dwell pressure will be described.

The injection/dwell control process shown in the flow chart of FIG. 2 is executed in the predetermined cycle equal to the aforesaid unit time $\tau$. The PMCCPU 111 first determines whether or not a flag F for storing the in-process state of the injection/dwell stage is set (Step S1). If the flag F is not set, it is then determined whether or not the injection is being carried out (Step S2). This determination is made on the basis of whether or not an injection/dwell stage flag to be set in the common RAM 102 by means of the PMCCPU 111 is previously set, when the injection/dwell process is started.

If the injection is not being carried out, it can be concluded that the injection/dwell stage is not being executed, so that another process is executed in accordance with the result of discrimination of a stage discrimination process.

If it is confirmed in Step S1 that the flag F is not set, and in Step S2 that the injection/dwell stage flag is set, it can be concluded that the pulse distribution by the NCCPU 109 for mold clamping is completed to be ready for the start of injection. Accordingly, the PMCCPU 111 sets the flag F for storing the in-process state of the injection/dwell stage (Step S3), drives the relay means 9 to shift the switches 6 and 8 to the side of the contact b, thereby starting the feedback control of the injection/dwell pressure (Step S4).

Then, an index i is set to 0 (Step S5), and the set injection pressure pi of the address designated by the index i is read from the injection pressure storage table of the common RAM 102, and delivered to the output circuit 104 (Step S6).

After having been converted into a voltage by the D/A converter 7, the set injection pressure pi is applied to the comparator 11 through the contact b of the changeover switch 6, and compared with the voltage corresponding to the present detected pressure, which has been detected by the pressure sensor 4 and amplified by the amplifier 10. The resulting difference is applied directly as the torque command voltage to the difference amplifier 206 of the servo circuit 200 via the contact b of the changeover switch 8, and is further amplified by the power amplifier 207. Then, the driving force of the injection servomotor 2 is feedback-controlled to make the present detected pressure equal to the set injection pressure pi.

On the other hand, after outputting the set injection pressure pi, the PMCCPU 111 increments the value of the index i (Step S7), and determines whether or not the value of the index i exceeds the value n stored in the register, that is, whether or not a torque control process for the last set injection pressure defined in the injection pressure storage table is completed (Step S8). If the torque control process in the injection/dwell stage is not completed (i≦n), the process for this cycle ends.

Since the flag F is previously set in the next cycle, that is, in the torque control process after the passage of the unit time &S, the program proceeds to Step S6 after the discrimination process of Step S1 is executed. Thereupon, the set injection pressure pi of the address i in the injection pressure storage table is delivered to the output circuit 104 in accordance with the value of the index i incremented in Step S7 of the preceding cycle, and the driving force of the injection servomotor 2 is feedback-controlled by the hardware comprising the pressure sensor 4, comparator 11, servo circuit 200, etc. to make the present detected pressure equal to the set injection pressure pi. The value of the index i is incremented (Step S7), and it is determined whether or not the value of the index i exceeds n (Step S8). If i≦n, the process for this cycle ends.

Thereafter, the processes of Step S1 and S6 to S8 are repeatedly executed for each predetermined cycle or unit time &S in the same manner as aforesaid until it is concluded in Step S8 that i is i>n.

Thus, the injection servomotor 2 is continually feedback-controlled so that the present detected pressure becomes equal to the set injection pressure pi of the address i in the injection pressure storage table, depending upon the elapsed time i·τ after the start of injection based on the unit time τ. Since the switching cycle τ of the set injection pressure pi is limited, a pressure curve for the actual injection/dwell stage is controlled substantially in the same manner as the function (see FIG. 4) set through the injection pressure setting picture.

If it is discriminated in Step S8 that i>n, while the torque control process is repeatedly executed in this manner, this means that the torque control process for the last set injection pressure defined in the injection pressure storage table is completed, or that the dwell stage is completed. Then, the PMCCPU 109 proceeds to Step S9 and drives the relay means 9 to restore the changeover switches 6 and 8 to the side of the contact a, whereupon the feedback control for the injection/dwell pressure of the injection servomotor 2 is finished. Thereafter, the flag F for storing the in-process state of the injection/dwell stage is reset (Step S10), and a flag indicative of the readiness for the start of metering is set (Step S11), whereupon all the processes associated with the injection/dwell stage are finished. In the metering stage, therefore, the position, speed, and torque are normally controlled by the servo circuit 200 in accordance with the conventional method, that is, the pulse distribution by the NCCPU 109 by the position command.

When the injection is started, the PMCCPU 111 drives the address generator 105 through the output circuit 104, and the address generator 105 successively assigns the addresses of the RAM 106 from 0, whereupon the actual injection pressure waveform data, detected by the pressure sensor 4 and converted into the digital value by the A/D converter 12, is stored in the RAM 106 in the cycle equal to the unit time τ.

If the molded article obtained is not a conforming one, the set injection pressure waveform has to be modified. A modification process for the injection pressure waveform, which constitutes a feature of the present invention, will be described later. If a conforming molded article is obtained, the PMCCPU 111, in response to a molding condition retention command, loads the various molding conditions for that time and the injection pressure waveform stored in the injection pressure storage table, along with a mold code, into the mold file of the common RAM 102.

The following is a description of the second embodiment of the method.

According to the second method, the operator first operates the CRT/MDI 115 to select an injection speed/dwell pressure setting mode to have an injection speed/dwell pressure setting picture displayed on the CRT screen, sets the injection speed switching position and injection speed in the injection stage, and sets the dwell pressure and dwell time in the dwell stage, as in the conventional method. Also, other molding conditions are set. Then, trial injection is executed under these set molding conditions. The PMCCPU 111 sequentially controls the mold clamping stage, injection/dwell stage, metering stage, cooling stage, and mold opening stage in the same manner as in the conventional method. On the other hand, the NCCPU 109 controls the individual stages in accordance with the NC programs stored in the common RAM 102 and the set molding conditions. When the injection stage is entered, the NCCPU 109 performs injection speed control such that the injection speed is switched to the set level every time the set injection speed switching position is reached by the screw position. When the dwell stage is entered, the resin is held under the set dwell pressure for a set time.

When the injection is started, on the other hand, the PMCCPU 111 drives the address generator 105 through the output circuit 104, and the address generator 105 successively assigns the addresses of the RAM 106 from 0, whereupon the actual injection pressure waveform data, detected by the pressure sensor 4 and converted into the digital value by the A/D converter 12, is stored in the RAM 106.

If no conforming molded article is obtained by the trial injection, the molding conditions are modified, and the trial injection is repeated. If a conforming molded article is obtained in this manner, the operator inputs an injection pressure waveform setting command through the CRT/MDI 115. In response to this command input, the PMCCPU 111 transfers the actual injection pressure waveform data, stored in the RAM 106, to the injection pressure storage table in the common RAM 102, and stores the injection pressure storage table with the injection pressure waveform data correspondingly to the addresses beginning from 0 and on.

In the process of obtaining the conforming molded article, the actual injection pressure waveform is invoked on the CRT screen to modify the injection pressure waveform as is mentioned later, and trial injection based on pressure feedback control is executed using the modified injection pressure waveform as the set injection pressure waveform. The injection pressure waveform and the molding conditions are modified until the conforming molded article can be obtained.

The following is a description of the modification process for the injection pressure waveform, which constitutes a feature of the present invention.

If no conforming molded article can be obtained when the injection pressure waveform for a new mold is set by the first method, the set injection pressure waveform should be modified. In such a case, the new mold may resemble the mold whose injection pressure waveform is previously retained, if so, the injection pressure waveform sometimes can be set by partially modifying the previously retained injection pressure waveform. Also, it is sometimes necessary to modify the actual injection pressure waveform stored in the RAM 106 in the process for obtaining the conforming molded article by the second method so that the modified injection pressure waveform can be used as the set injection pressure waveform, without modifying the injection pressure waveform stored in the injection pressure storage table.

According to the present invention, therefore, the injection pressure waveform, which, in conjunction with the injection pressure modification command, constitutes the base of the modification, is assigned. For example, if the injection pressure modification command is inputted through the CRT/MDI 115, a message will be displayed on the CRT screen, suggesting to determine whether the injection pressure waveform as the base of the modification is the injection pressure waveform currently set in the injection pressure storage table, or the injection pressure waveform retained in the mold file, or the actual injection pressure waveform stored in the RAM 106. If the injection pressure waveform retained in the mold file is selected, a message requiring the input of the mold code will be displayed. If the operator assigns the injection pressure waveform as the base of the modification, the injection pressure waveform modification process will be started.

Figure 3:
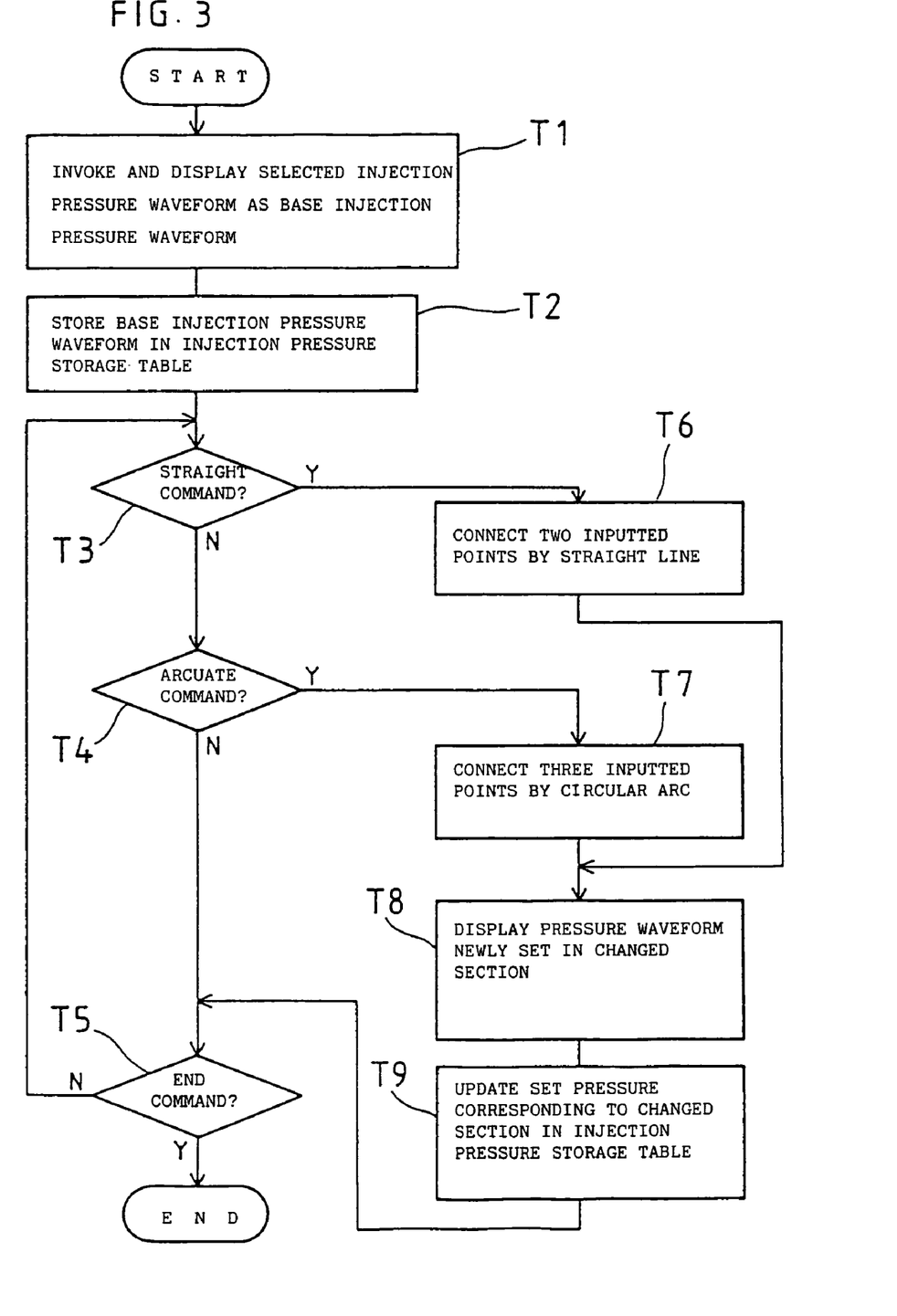
FIG. 3 is a flow chart showing an injection pressure waveform modification process carried out according to the embodiment.

Referring to the flow chart of FIG. 3, the injection pressure modification process will be described. First, the selected injection pressure waveform is invoked and displayed as a base injection pressure waveform on the CRT screen. More specifically, if the currently set injection pressure waveform is selected, the injection pressure waveform set in the injection pressure storage table is drawn. If the injection pressure waveform retained in the mold file is selected, the injection pressure waveform of the selected mold code is drawn. If the actual injection pressure waveform is selected, the injection pressure waveform stored in the RAM 106 is read and drawn (Step T1). Then, the drawn base injection pressure waveform is stored in the injection pressure storage table in the common RAM 102 (Step T2). The operator determines whether the portion to be modified should be changed into a straight line or into a circular arc. If the straight line is selected, the soft key 116a is operated; the cursor is then moved to the starting point on the injection pressure waveform to be changed into the straight line among the drawn injection pressure waveforms; the input keys are operated to input the starting point; and the end point is set on the injection pressure waveform in like manner. If the portion is to be modified by means of the circular arc, the soft key 116b is operated; the starting point and end point of the circular arc are set on the injection pressure waveform in like manner; and another point is further assigned between the starting and end points.

On the other hand, the PMCCPU 111 determines whether or not a straight command, arcuate command, and end command have been inputted by the soft key 116a to 116c (Steps T3 to T5). If the straight command has been inputted, two points inputted at that time are connected (Step T6), whereupon the program proceeds to Step T8. If the arcuate command is inputted, three points inputted at that time are connected by means of a circular arc, whereupon the program proceeds to Step T8. In Step T8, a newly set injection pressure waveform is displayed in a changed section, and a set pressure corresponding to the changed section of the injection pressure storage table is updated on the basis of the newly drawn injection pressure waveform (Step T9). In the present embodiment, the soft keys 116a and 116b and the processes of Steps T3, T4, T6, T7 and T8 constitute injection pressure waveform changing means, while the process of Step T9 constitutes injection pressure setting means.

When the end command is inputted by means of the soft key 116c after the aforesaid processes of T3, T4 and T6 to T9 are repeatedly executed for changed sections, this injection pressure waveform modification process is finished. If the base injection pressure waveform corresponds to the full line extending from the point P1 to the point P10, as shown in FIG. 4, for example, part of this injection pressure waveform can be modified into the waveform indicated by the broken line in the following manner. An arcuate command is inputted specifying the points P8, P12 and P11 as the starting point, end point and intermediate point respectively, and further an arcuate command is inputted specifying the points P12, P14 and P13 as the starting point, end point and intermediate point respectively. By doing so, the injection pressure waveform can be modified into one represented by a line connecting the points P1 to P8, P10, P12, P13, P14 and P10.

Then, trial injection is effected, and the aforesaid processes are repeatedly executed until the conforming molded article can be obtained. When the conforming molded article is obtained, a molding condition retention command is inputted. The PMCCPU 111 loads the mold file of the common RAM 102 with the various molding conditions at that time and the injection pressure waveform stored in the injection pressure storage table, along with the mold code.

If the injection molding machine is set to a continuous molding mode and started after the molding conditions and injection pressure waveform for the conforming molded article are set, the PMCCPU 111 sequentially controls the mold clamping stage, injection/dwell stage, metering stage, cooling stage, and mold opening stage in the same manner as in the conventional case. On the other hand, the NCCPU 109 controls the individual stages in accordance with the NC programs stored in the common RAM 102 and the set molding conditions. When the injection/dwell stage is entered, the injection pressure feedback control shown in the flow chart of FIG. 2 is performed, so that injection/dwell pressure is controlled to agree with the set injection pressure waveform.

In the embodiment described above, the mold file is provided in the common RAM 102. If the common RAM 102 has no capacity to spare, however, a disk controller may be connected to the OPC 13 so that the mold file is provided in a floppy disk by means of the disk controller. In this case, the aforesaid injection pressure waveform can be stored in the floppy disk.

The invention claimed is:

1. A pressure waveform setting method for injection pressure control of a resin, comprising:
   adjusting at least one molding condition for injection pressure control of the resin until conforming molded articles are obtained, to generate at least one adjusted molding condition;
   performing injection pressure control of the resin, based on the at least one adjusted molding condition;
   detecting a pressure acting on the resin during an injection/dwell stage of the injection pressure control when molded articles are obtained, as a function of time; and
   setting an injection pressure waveform as a target injection pressure waveform for pressure feedback control in the injection/dwell stage;
   wherein the at least one molding condition includes an injection pressure switching screw position, an injection speed, a dwell pressure and a dwell time, wherein the injection pressure switching screw position and the injection speed are set for the injection/dwell stage in an injection speed control section of an injection molding machine, and wherein the dwell pressure and dwell time are set in a dwell section of the injection molding machine;
   wherein said adjusting, performing and detecting are repeated until a conforming molded article is obtained;
   wherein said setting the injection pressure waveform is performed when the conforming molded article is obtained; and
   setting the at least one molding condition when the conforming molded article is obtained.

2. A method for generating a modified injection pressure waveform for feedback control of a pressure exerted on a resin in an injection molding machine, comprising:
   storing an actual injection pressure waveform in a memory;
   displaying on a display, the injection pressure waveform stored in said storing;
   modifying a portion of the injection pressure waveform displayed in said displaying; and
   storing the modified injection pressure waveform modified in said modifying in the memory, as a target injection pressure waveform.

3. A method as claimed in claim 2, wherein said modifying includes:
   designating first and second points on the injection pressure waveform displayed on the display, and
   changing the injection pressure waveform between the two points, into a straight line connecting the first and second points.

4. A method as claimed in claim 2, wherein said modifying includes:
   designating first and second points on the injection pressure waveform displayed on the display,
   designating a third point on the injection pressure waveform between the first and second points, and
   changing the injection pressure waveform between the first and second points, into a curve connecting the first, second and third points.

5. A pressure waveform setting method for injection pressure control, comprising:
   previously storing for an original mold a set injection pressure waveform observed when a molded article is obtained, or an injection pressure waveform obtained by detecting a pressure acting on a resin during an injection/dwell stage as a function of time;
   invoking and displaying on a display device the injection pressure waveform of the original mold which has already been stored when a new mold to be used for molding is similar to the original mold;
   assigning two points in the displayed injection pressure waveform;
   changing the injection pressure waveform between said two points into a straight line connecting said two points to draw a straight line, to generate a modified injection pressure waveform;
   assigning two points in the injection pressure waveform as a starting point and an end point individually;
   assigning one point between said starting and ending points to change the injection pressure waveform between said starting and end points into a curve connecting the one point and the starting and end points into a curve connecting the one point and the starting and ending points in a circular arc, to draw a curve, to generate the modified injection pressure waveform;
   reading and setting, as the set injection pressure waveform, an injection pressure for each predetermined time interval from the modified injection pressure waveform; and
   performing injection molding based on the set injection pressure waveform set from the modified injection pressure waveform.

6. A method as claimed in claim 5, wherein said modifying includes:
   designating first and second points on the first injection pressure waveform; and
   changing a portion of the first injection pressure waveform between the first and second points into a straight line, to generate the second injection pressure waveform.

7. An injection molding machine for changing pressure waveform for molding an article, which is controlled by at least one processor for detecting a pressure acting on a resin during an injection stage and provides feedback control of said detected pressure so that the detected pressure agrees with injection pressure waveforms stored as a function of time in set injection pressure storage means, the injection molding machine having a display device, comprising;
   storage means for storing and retaining said injection pressure waveforms;
   display control means for causing an injection pressure waveform, selected among the injection pressure waveforms stored in said storage means, to be displayed on a screen of the display device;
   injection pressure waveform changing means for assigning two points in the injection pressure waveform displayed on said display means, and changing the injection pressure waveform between said two points into a straight line connecting said two points to draw a straight line, and for assigning two points in the injection pressure waveform as a starting point and an end point individually, assigning one point between said starting and ending points, and changing the injection pressure waveform between said starting and end points into a curve connecting the one point and the starting and ending points in a circular arc to draw a curve;

injection pressure waveform setting means for reading an injection pressure for each predetermined time interval from the injection pressure waveform drawn on the screen of the display device and having at least one of the straight line and the curve, and storing the read injection pressure as set injection pressure waveform data, in the injection pressure waveform setting means; and injection molding means for molding the article, based on the set injection pressure waveform data set from the injection pressure waveform having at least one of the straight line and the curve.

8. An injection molding machine capable of changing a pressure waveform for molding an article, which is controlled by at least one processor for detecting a pressure acting on a resin during an injection stage and provides feedback control of said detected pressure so that the detected pressure agrees with an injection pressure waveform stored as a function of time in set injection pressure storage means, the injection molding machine having a display device, and receiving an injection pressure waveform modification command, comprising:

storage means for storing the pressure on the resin detected for each predetermined time interval during the injection stage to obtain an actual injection pressure waveform stored in said storage means;

display control means for causing the actual injection pressure waveform stored in said storage means to be displayed on a screen of the display device in response to the injection pressure waveform modification command;

injection pressure waveform changing means for assigning two points in the injection pressure waveform displayed on said display means and changing the injection pressure waveform between said two points into a straight line connecting said two points, to draw a straight line, and for assigning two points in the injection pressure waveform as a starting point and an end point individually, assigning one point between said starting and ending points, changing the injection pressure waveform between said starting and end points into a curve connecting the one point and the starting and ending points in a circular arc to draw a curve;

injection pressure waveform setting means for reading an injection pressure for each predetermined time interval from the injection pressure waveform drawn on the screen of the display device and having at least one of the straight line and the curve, and storing the read injection pressure as set injection pressure waveform data, in the injection pressure waveform setting means; and injection molding means for molding the article, based on the set injection pressure waveform data set from the injection pressure waveform having at least one of the straight line and the curve.

* * * * *

UNITED STATES PATENT AND TRADEMARK OFFICE
CERTIFICATE OF CORRECTION

PATENT NO. : 7,344,664 B2 Page 1 of 1
APPLICATION NO. : 11/126141
DATED : March 18, 2008
INVENTOR(S) : Masao Kamiguchi et al.

It is certified that error appears in the above-identified patent and that said Letters Patent is hereby corrected as shown below:

Column 5, Line 41, change "ORT" to --CRT--.

Column 5, Line 47, change "tower" to --lower--.

Signed and Sealed this

Fifth Day of August, 2008

JON W. DUDAS
*Director of the United States Patent and Trademark Office*